(12) United States Patent
Hsieh

(10) Patent No.: US 6,663,248 B2
(45) Date of Patent: Dec. 16, 2003

(54) DRIVING CIRCUIT FOR LED LAMPS

(76) Inventor: Chin-Mu Hsieh, No. 5, Lane 93, Kungyuan Rd., Yungkang City, Tainan Hsien (TW)

( * ) Notice: Subject to any disclaimer, the term of this patent is extended or adjusted under 35 U.S.C. 154(b) by 0 days.

(21) Appl. No.: 10/127,438

(22) Filed: Apr. 23, 2002

(65) Prior Publication Data

US 2003/0197477 A1 Oct. 23, 2003

(51) Int. Cl.$^7$ ................................................ H05B 37/00
(52) U.S. Cl. ......................................... 362/20; 315/88
(58) Field of Search .............................. 315/88, 89, 91, 315/90; 362/20, 800

(56) References Cited

U.S. PATENT DOCUMENTS 5,303,124 A * 4/1994 Wrobel .................... 362/20

* cited by examiner

Primary Examiner—David Hung Vu
(74) Attorney, Agent, or Firm—Rosenberg, Klein & Lee

(57) ABSTRACT

A driving circuit for LED lamps includes a DC power unit, a control unit connected to a bank of LEDs, and a backup power unit. The DC power unit outputs DC power to the control unit, the bank of LEDs, and the backup power unit. When DC power from the DC power unit is interrupted, the backup power unit outputs DC power to the bank of LEDs. The driving circuit may be incorporated into various lamp types, including wall lamps, indicator lamps, and emergency lamps.

8 Claims, 3 Drawing Sheets

DRIVING CIRCUIT FOR LED LAMPS

BACKGROUND OF THE INVENTION

1. Field of the Invention

The present invention relates to a driving circuit for LED lamps, and more particularly to a driving circuit for a lamp that has a DC power unit, a control unit and a backup power unit. The backup power unit provides power to the control unit to drive the LED lamp when the output of the DC power unit is interrupted.

2. Description of Related Art

When the LED was developed, many colors were available from red, green, blue, etc. and now white. The LED has the advantages of being a low power device, operating for long periods without needing to be replaced, providing stable light, etc. Therefore, some companies have planes that use LEDs as a light source rather than incandescent lights, fluorescent tubes, etc.

A lamp that uses LEDs not only consumes significantly less power but also can be used for a longer period. Therefore LED lamps are able to meet the requirements in and supplant the conventional lamp market in a short time.

The present invention provides a driving circuit to make the LED lamp adapt to many uses to satisfy the lamp market.

SUMMARY OF THE INVENTION

The main objective of the invention is to provide a driving circuit for an LED lamp. The driving circuit has an uninterruptible power capability and adapts to many kinds of uses of lamps, such as indictor lamps, wall lamps, etc.

Another objective is to provide a lamp that can use either AC power or DC power to drive the LEDs.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 5, a driving circuit in accordance with the present invention is used with a lamp (20) such as desk lamp, a wall lamp or and has an uninterruptible power capability. With reference to FIGS. 2 to 5, the driving circuit connected to a bank of LEDs (10) connected in parallel comprises a DC power unit (11, 11a, 11b), a control unit (12, 12a) and a backup power unit (13).

Figure 1:
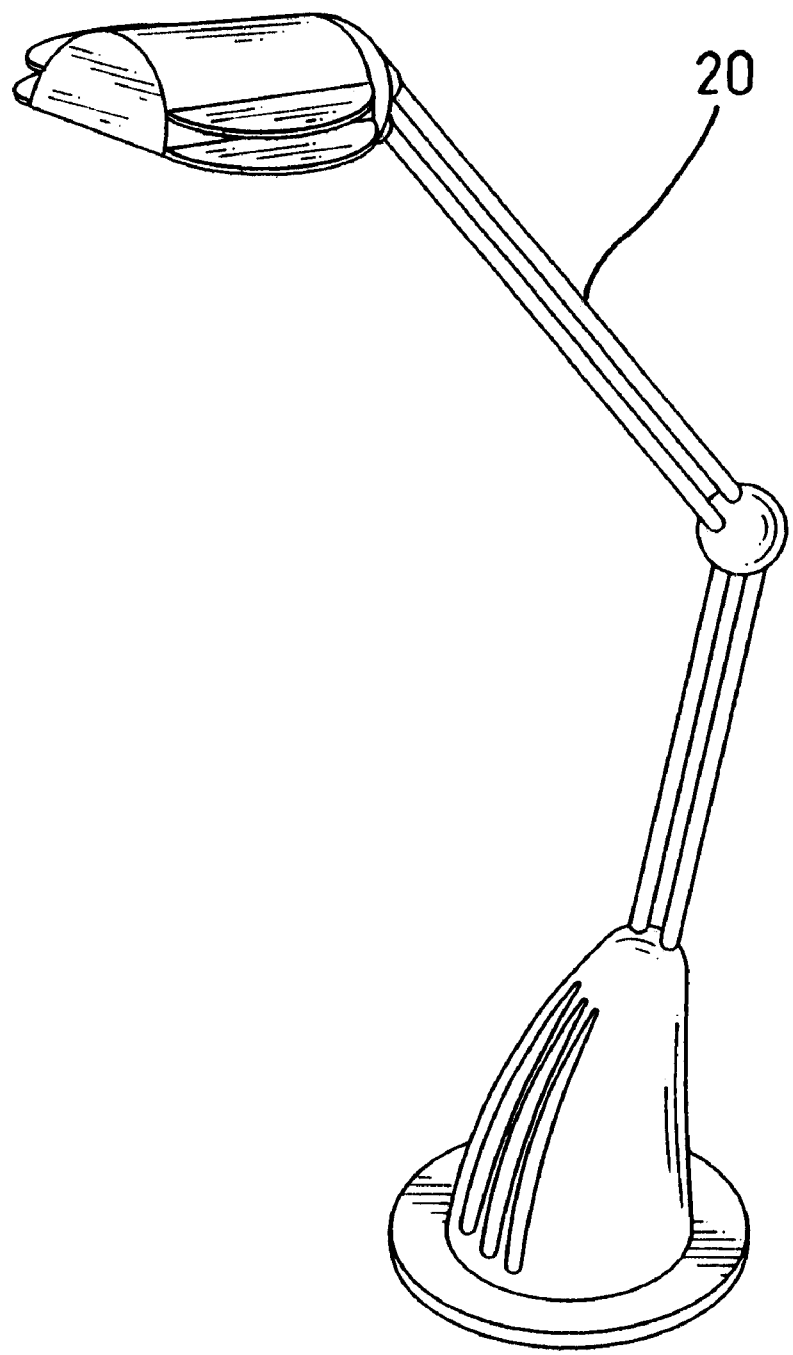
FIG. 1 is a perspective view of an LED lamp with a driving circuit in accordance with the present invention.
Figure 2:
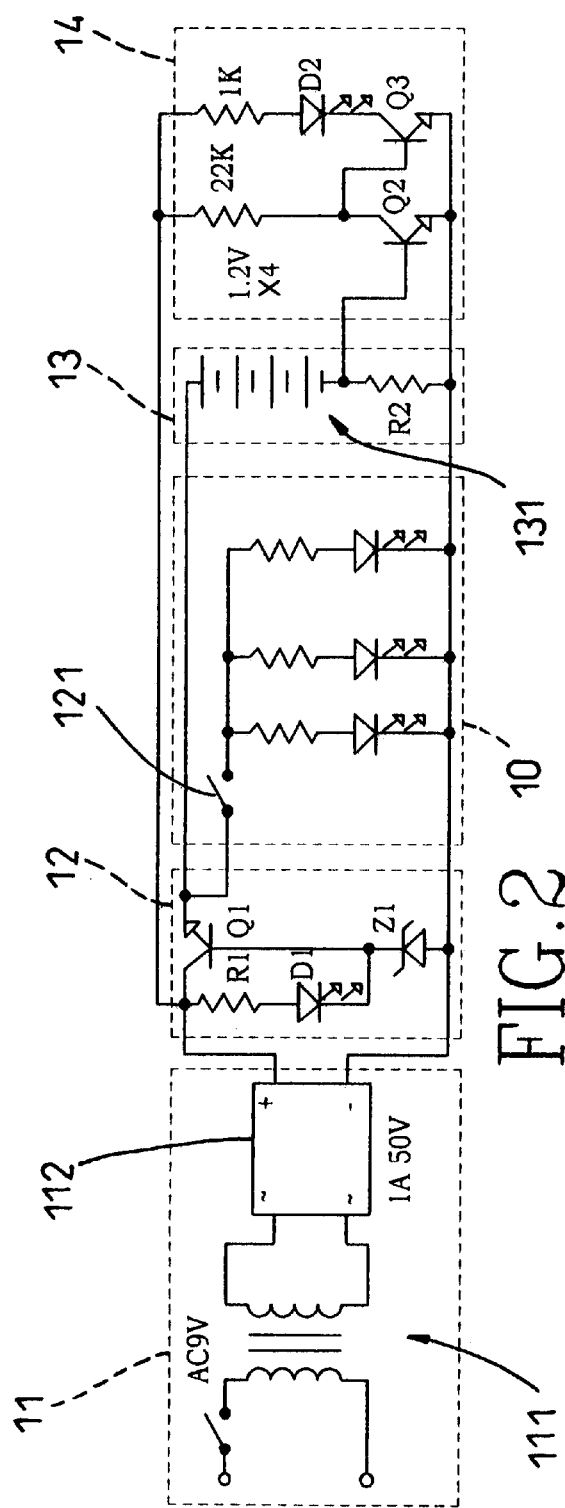
FIG. 2 is a circuit diagram of a first embodiment of a driving circuit in accordance with the present invention for an LED.
Figure 4:
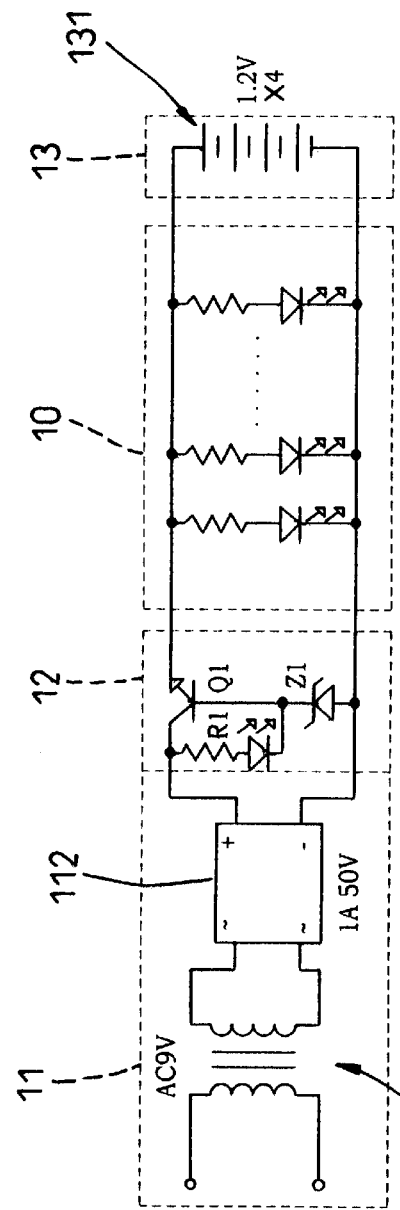
FIG. 4 is a circuit diagram of a third embodiment of a driving circuit in accordance with the present invention for an LED.

With reference to FIGS. 2 and 4, the DC power unit (11) in a first and third embodiment of the driving circuit outputs DC power and has a transformer (111) and a rectifier (112) to convert AC power to DC power. The transformer (111) has a first coil and a second coil, and the rectifier (112) is connected to the second coil to output DC power.

Figure 3:
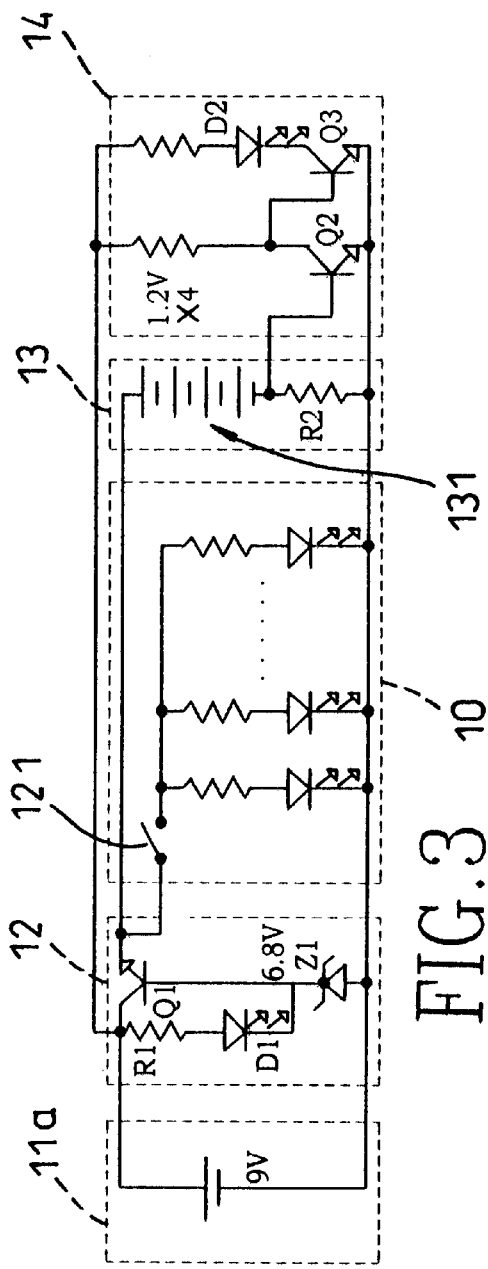
FIG. 3 is a circuit diagram of a second embodiment of a driving circuit in accordance with the present invention for an LED.

With reference to FIGS. 2, and 3 the control unit (12) in a first and second embodiment of the driving circuit has an input terminal, a ground terminal and an output terminal. The input terminal is connected the DC power unit (11, 11a) and the output terminal is connected to the bank of LEDs (10) through a switch (121). The control unit (12) is composed of a transistor (Q1), a resistor (R1), an LED (D1) and a zener diode (Z1). The transistor (Q1) has base, collector and emitter terminals. The LED (D1) and the resistor (R1) are respectively connected to the base terminal and the collector terminal of the transistor (Q1). The zener diode (Z1) is connected between the base terminal with the ground terminal. The collector terminal is connected to the power unit (11).

With reference to FIGS. 2 to 5, the backup power unit (13) in all embodiments of the driving circuit is connected to the control unit (12) and the LEDs (10).

With reference to FIGS. 2 and 3, the back up power unit (13) in the first and second embodiment of the driving circuit is composed of a rechargeable battery (131) and a ground resistor (R2). The backup power unit (13) is connected to the power unit (11) through the control unit (12). Therefore the battery (131) is bale to be recharged by the DC power unit (11) during the DC power unit (11) is outputting the DC power.

With reference to FIGS. 2 and 3, the first and second embodiment of the driving circuit further comprises an indicator unit (14). The indicator unit (14) is composed of an LED (D2), a first transistor (Q2) and a second transistor (Q3). The first transistor (Q2) is connected between the ground resistor (R2) and the DC power unit (11). The second transistor (Q3) is connected between the first transistor (Q2) and an LED (D2).

When the DC power unit (11) outputs DC power, the resistor (R1) has a voltage is dropped across the control unit resistor (R1), which turns on the control unit transistor (Q1). At the same time, the LED (D1) in the control unit (12) lights up to show that the power unit (11) normally outputs the DC power. When the switch (121) is closed, the DC power is input to the LEDs through the control unit (12) to turn on the LEDs (10). The backup power unit (13) has a recharged current from the DC power unit (11) to recharge. The recharged current passes the ground resistor (R2) to have a voltage to drive the first transistor (Q2) to turn on. And then the second transistor (Q3) turns off so that the LED (D2) does not light. On the other hand, when the battery (131) has enough power and then the recharged current does not pass the ground resistor (R2), so that the transistor (Q3) turns on to make the LED (D2) turn on. Therefore, the LED (D2) of the indicator unit (14) lights up to show that the battery (131) still has enough DC power.

If the DC power unit (11) interrupts the DC power output, the transistor (Q1) of the control unit (12) turns off to insulate the DC power unit (11) and the backup power unit (13). Because the switch (121) still is closed, the backup power unit (13) outputs the DC power to make the parallel connection of the LEDs (10) continue to light up. Therefore, user only controls the switch (121) to be closed, the LED lamp always turn on. The LED lamp with this control circuit is applied to the lighting lamp or wall lamp.

With reference to FIG. 3, the second embodiment of the control circuit has one difference from the first embodiment in FIG. 2, that is a DC power unit (11a) is a DC adapter to output the DC power. Therefore, the driving circuit also is applied to the wall or the lighting lamp.

Referring to FIG. 4, the third embodiment of the control circuit has one difference with the first embodiment in FIG. 2, that is a driving circuit is applied to the inductive LED lamp. The driving circuit does not use the switch (not shown), so that the control unit (12) and the backup power unit (13) are connected to the parallel connection of the LEDs (10).

When the DC power unit (11) outputs the DC power normally, the control unit (12) turns on to drive the LEDs (10) light up. At the same time, the recharging battery (131) is recharged. Therefore, when the DC power unit (11) does not output the DC power, the backup power unit (13) outputs the DC power to the LEDs (10). Thus the indicative lamp is able to keep LEDs (10) turning on.

Figure 5:
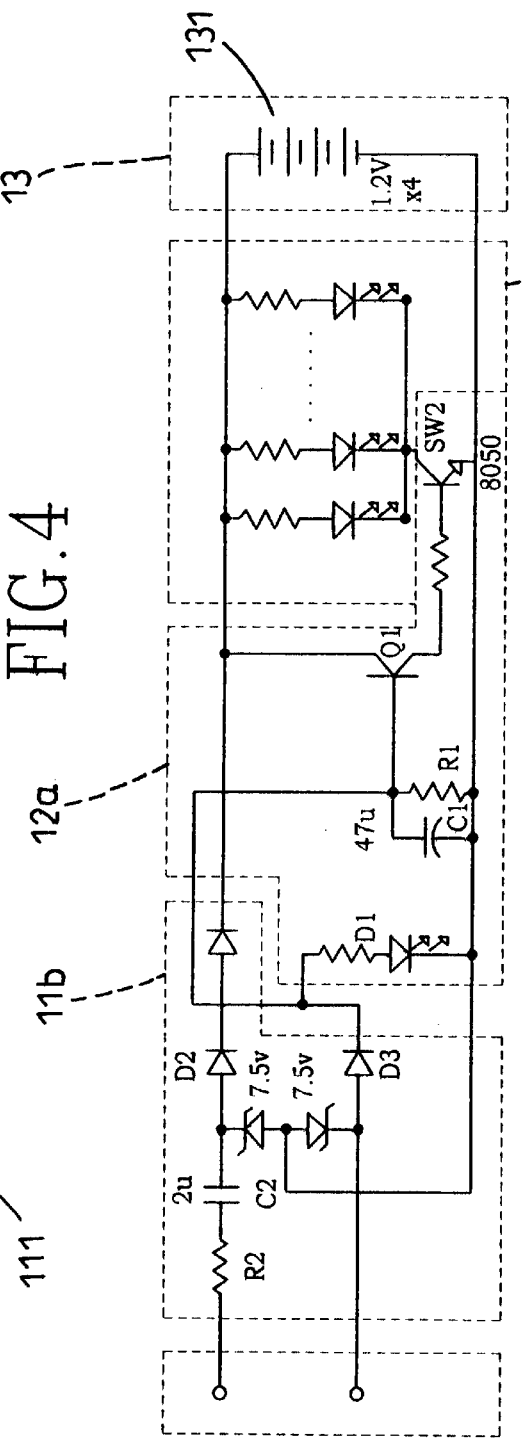
FIG. 5 is a circuit diagram of a fourth embodiment of a driving circuit in accordance with the present invention for an LED.

With reference to FIG. 5, the fourth embodiment of the driving circuit is applied to an urgent lamp which to be driven to light up when the AC power is interrupted. A DC power unit (11b) and a control unit (12a) are different with the driving circuit in the FIG. 4.

The control unit (12a) comprises a discharge loop (R1, C1), one transistor (Q1) connected to the discharge loop (R1, C1) and an electronic switch (SW2) connected to the LEDs (10). The discharge loop (R1, C1) is a parallel connection of resistor (R1) and capacitor (C1) having two nodes, wherein the two nodes respectively connected to the transistor (Q1) and ground. The DC power unit (11b) comprises a resistor (R2) connected to the AC power, a capacitor (C2) connected to the resistor and a rectifier (D2, D3) connected to the capacitor (C2). The DC power is connected to the AC power to output the DC power to the control unit (12a).

The capacitor (C1) of the control unit (12a) is charging during the DC power unit (11b) outputs the DC power, and the battery (131) also is charging in the same time. When the AC power interrupted, the capacitor (C1) starts to discharge through the resistor (R1). Therefore, the resistor (R1) has a bias voltage to drive the transistor (Q1) to turn on the electronic switch (SW2). At and the battery (13) outputs the DC power to drive the LEDs (10). Therefore the LED lamp with the fourth driving circuit can drive the LEDs (10) to light up when the AC power is interrupted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A driving circuit for an LED lamp comprising:
    a DC power unit for outputting DC power;
    a control unit selectively connected between the DC power unit and a bank of parallel connected LEDs, the control unit including:
        a transistor;
        a resistor connected between the DC power unit and the transistor to provide a biasing voltage to the transistor;
        an LED connected to the transistor and the resistor; and,
        a zener diode connected to the LED and the transistor; and,
    a backup power unit connected to the DC power through the control unit and connected to the LEDs, wherein the backup power unit is recharged by the power unit through the control unit, and the backup power unit outputs DC power to the LEDs when DC power from the DC power unit is interrupted.

2. The driving circuit for an LED lamp as claimed in claim 1, wherein the backup power unit includes a rechargeable battery.

3. The driving circuit for an LED lamp as claimed in claim 2, wherein the DC power unit comprises a transformer connected to an AC power source and a rectifier connected to the transformer to convert AC power to DC power.

4. The driving circuit for an LED lamp as claimed in claim 2, wherein the backup power unit further comprises an indicator unit that includes an LED, and an electronic switch to turn on or turn off the LED.

5. The driving circuit for an LED lamp as claimed in claim 2, wherein the DC power unit includes a DC adapter.

6. The driving circuit for an LED lamp as claimed in claim 2, wherein the DC power unit comprises a resistor connected to AC power, a capacitor connected to the resistor and a rectifier connected to the capacitor, wherein the DC power unit converts the AC power to DC power.

7. The driving circuit for an LED lamp as claimed in claim 6, wherein the control unit comprises:
    a discharge loop including a parallel connection of a capacitor and a resistor;
    a transistor connected to the resistor for actuation responsive to a voltage thereacross; and,
    an electronic switch connected between the transistor and the LEDs to control actuation of the LEDs.

8. The driving circuit for an LED lamp as claimed in claim 1, further comprising a switch connected to the control unit, the backup power unit and the LEDs.

* * * * *